United States Patent
Elnozahy et al.

(10) Patent No.: US 8,838,939 B2
(45) Date of Patent: Sep. 16, 2014

(54) DEBUGGING MULTITHREADED CODE BY GENERATING EXCEPTION UPON TARGET ADDRESS CAM SEARCH FOR VARIABLE AND CHECKING RACE CONDITION

(75) Inventors: Elmootazbellah N. Elnozahy, Austin, TX (US); Ahmed Gheith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 13/439,229

(22) Filed: Apr. 4, 2012

(65) Prior Publication Data

US 2012/0203979 A1  Aug. 9, 2012

Related U.S. Application Data

(63) Continuation of application No. 12/762,817, filed on Apr. 19, 2010, now abandoned.

(51) Int. Cl.
*G06F 9/312* (2006.01)
*G06F 9/38* (2006.01)

(52) U.S. Cl.
CPC .................................. *G06F 9/3824* (2013.01)
USPC ........................... 712/216; 711/145; 711/150

(58) Field of Classification Search
CPC combination set(s) only.
See application file for complete search history.

(56) References Cited

U.S. PATENT DOCUMENTS

| 5,420,990 A | 5/1995 | Mckeen et al. |
| 6,101,586 A | 8/2000 | Ishimoto et al. |
| 7,757,237 B2 | 7/2010 | Karp et al. |
| 8,006,075 B2 | 8/2011 | Luttrell |
| 2011/0258421 A1 | 10/2011 | Elnozahy et al. |

FOREIGN PATENT DOCUMENTS

| CN | 101645034 A | 2/2010 |
| EP | 0 982 658 A2 | 3/2000 |
| EP | 2 151 760 A2 | 2/2010 |

OTHER PUBLICATIONS

He, Guojin et al., "Ex-Mon: An Architectural Framework for Dynamic Program Monitoring on Multicore Processors", Proceedings of the 12th Workshop in Interaction between Compilers and Computer Architectures (INTERACT-12), http://pdf.aminer.org/000/351/394/determining_the_value_of_monitoring_for_dynamic_monitor_selection.pdf, 2008, 10 pages.

(Continued)

*Primary Examiner* — Kenneth Kim
(74) *Attorney, Agent, or Firm* — Francis Lammes; Stephen J. Walder, Jr.; John D. Flynn

(57) ABSTRACT

Mechanisms are provided for debugging application code using a content addressable memory. The mechanisms receive an instruction in a hardware unit of a processor of the data processing system, the instruction having a target memory address that the instruction is attempting to access. A content addressable memory (CAM) associated with the hardware unit is searched for an entry in the CAM corresponding to the target memory address. In response to an entry in the CAM corresponding to the target memory address being found, a determination is made as to whether information in the entry identifies the instruction as an instruction of interest. In response to the entry identifying the instruction as an instruction of interest, an exception is generated and sent to one of an exception handler or a debugger application. In this way, debugging of multithreaded applications may be performed in an efficient manner.

20 Claims, 3 Drawing Sheets

(56) References Cited

OTHER PUBLICATIONS

International Search Report and Written Opinion dated May 27, 2011 for International Application No. PCT/EP2011/055029, 12 pages.
U.S. Appl. No. 12/762,817.
"Simultaneous multithreading", Wikipedia, Feb. 15, 2010, XP002636641, Retrieved from the Internet: URL: http://en.wikipedia.org/w/index.php?title=Simultaneous_multithreading&oldid=344248521 [retrieved on May 13, 2011], 4 pages.
Pagiamtzis, Kostas, "Content-Addressable Memory (CAM) Circuits and Architectures: A Tutorial and Survey", IEEE Journal of Solid-State Circuits, vol. 41, No. 3, Mar. 2006, pp. 712-727.
Zhou, Yuanyuan et al., "Efficient and Flexible Architectural Support for Dynamic Monitoring", Transactions on Architecture and Code Optimization, vol. 2, No. 1, Mar. 2005, pp. 3-33.
Office Action mailed Feb. 25, 2013 for U.S. Appl. No. 12/762,817, 12 pages.
Notice of Allowance mailed Jun. 25, 2013 for U.S. Appl. No. 12/762,817, 7 pages.
Response to Office Action filed May 23, 2013, U.S. Appl. No. 12/762,817, 32 pages.

DEBUGGING MULTITHREADED CODE BY GENERATING EXCEPTION UPON TARGET ADDRESS CAM SEARCH FOR VARIABLE AND CHECKING RACE CONDITION

This application is a continuation of application Ser. No. 12/762,817, filed Apr. 19, 2010, status pending.

BACKGROUND

The present application relates generally to an improved data processing apparatus and method and more specifically to mechanisms that provide support for debugging multi-threaded code.

Writing computer programs to run in a multitude of threads is a recognized method in the current state of the art to improve application performance. Unlike single-threaded applications, which execute instructions sequentially according to program order, multithreaded applications improve performance by running multiple threads simultaneously on various processing components of a system. Performance improves because more than one processor or hardware thread are typically running the multithreaded code, thereby helping the application complete its tasks in shorter time.

The development of multithreaded applications remains a difficult task, however, because the programmer often has to insert synchronization code to make the threads behave in a desired manner to compute the equivalent result of the application running as a sequential program. Such synchronization code can be difficult to write and maintain. Another difficulty in developing multithreaded application code is to organize the sharing of data among the threads. Without careful organization of how threads share data among themselves, the threads within an application may overwrite each other's changes to data items in memory, or may produce unpredictable results because reads and writes of the same data item are not ordered properly. This condition is usually called a "data race" or simply a "race condition."

Many synchronization primitives have been invented to aid programmers in developing multithreaded applications. For example, semaphores, locks, and monitors are generally recognized techniques to impose order on shared data access and to ensure that threads interact with one another in a predictable manner. When a correctly written parallel program uses these constructs, it will generally produce correct results and behave in a deterministic manner. However, even with these constructs and primitives, the task of developing multi-threaded code is not a simple one. A programmer may forget to protect access to a shared data item by failing to introduce the proper synchronization code. Such unprotected accesses are called demonic accesses, and are very difficult to track at runtime.

Since no application code can be realistically assumed to be correct upon implementation, a debugging and testing phase usually follows code development. During this phase, the application runs a test suite (usually called regression testing) and the results are examined to see if the application can be released. If the results show errors in the application code, it is debugged by several techniques such as relating the errors back to their origins until the source of error has been identified and corrected. This technique, already difficult in sequential debugging, is even more difficult to use in multi-threaded code because the application code is often not deterministic. For example, if there is a demonic access of shared data, a run of an application may have different possible schedules for the demonic access, and some of these schedules may not produce an error at all. Thus, repeating the execution of the application to find bugs is not a viable approach in debugging multithreaded code.

To exacerbate the problem, there is a dearth of tools that can help in debugging multithreaded applications. Unlike sequential code where the programmer can use tools to observe the behavior of the code as it runs through the different phases of a program, a parallel program may not execute in the same manner every time. Thus, there will be situations where a bug manifests itself some of the time, or worse yet, a bug may manifest itself rarely, making it difficult to uncover. Furthermore, many of the conventional techniques for sequential debugging may perturb the timing of a parallel program so as to mask the appearance of bugs while the debugging session is on, only to appear later when the debugging tools have been disengaged.

SUMMARY

In one illustrative embodiment, a method, in a processor of a data processing system, is provided for debugging application code. The method comprises receiving an instruction in a hardware unit of the processor, the instruction having a target memory address that the instruction is attempting to access. The method further comprises searching a content addressable memory (CAM) associated with the hardware unit for an entry in the CAM designating a range of addresses that includes the target memory address. Moreover, the method comprises, in response to finding an entry in the CAM designating a range of addresses that include the target memory address, determining if information in the entry identifies the instruction as an instruction of interest. In addition, the method comprises, in response to the entry identifying the instruction as an instruction of interest, generating an exception and sending the exception to one of an exception handler or a debugger application.

The method further includes the programmer loading the CAM associated with the hardware with ranges of addresses including variables shared among various threads in the program. Furthermore, the method includes setting the CAM of every hardware thread that runs an application thread according to an embodiment of this invention. The program is then run, and if a thread accesses a variable in the ranges specified in the CAM, a debugger verifies that the application has procured the necessary synchronization construct prior to accessing the variable. An access to a variable without protection is a potential for a synchronization bug, which is difficult to detect in conventional debugging.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
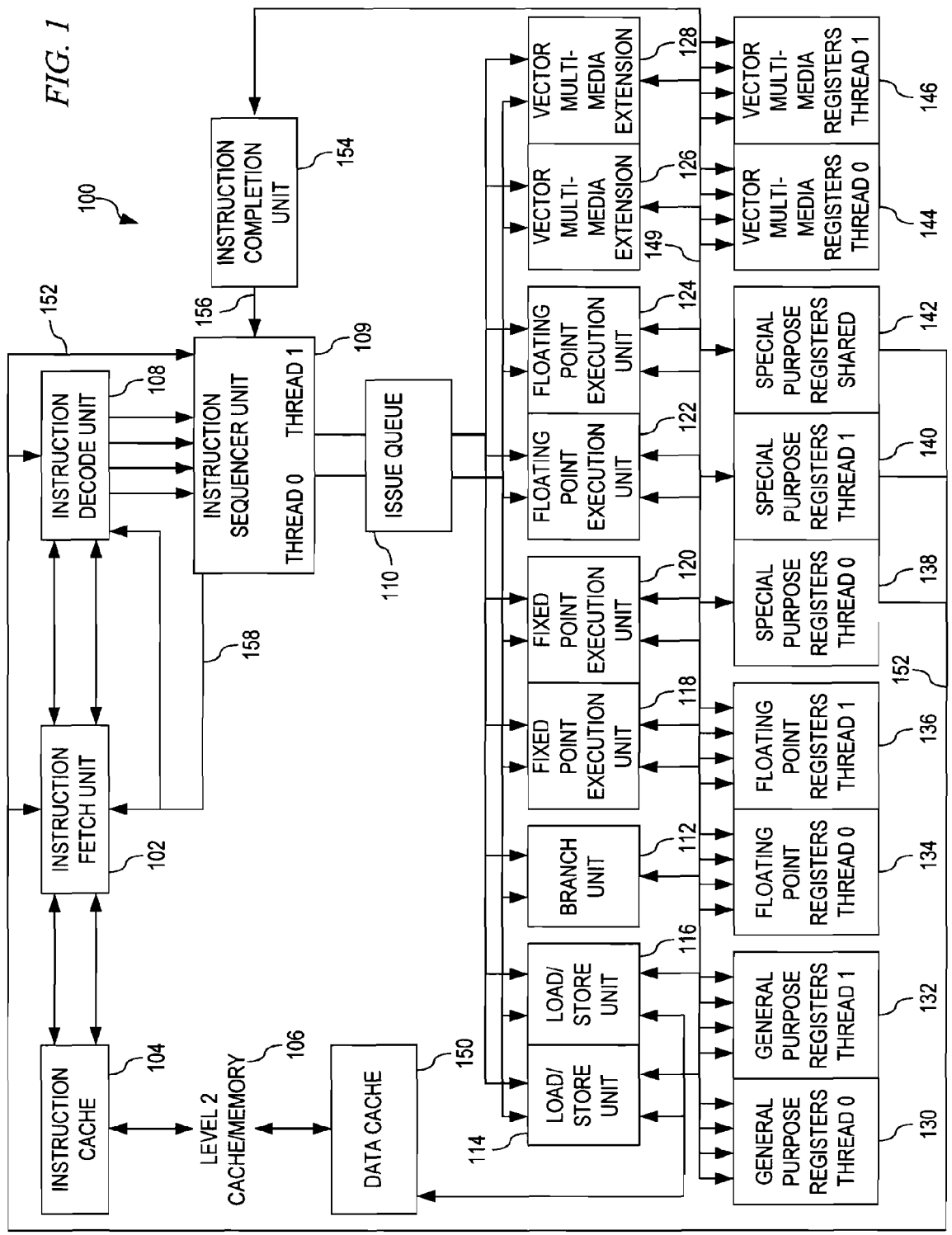
FIG. 1 is an example diagram of a processor architecture in which aspects of the illustrative embodiments may be implemented.

The illustrative embodiments provide a mechanism for providing debugging support for multi-threaded computer code. The mechanisms of the illustrative embodiments provide hardware support that enables an application to track memory accesses to several ranges in memory. The hardware support includes a content addressable memory (CAM) structure that can be set either by the application or a debugger that controls the application. Each entry in the CAM structure has a starting address, which designates the starting address of a range of memory being monitored. The entry further comprises a length field, which designates the size of the range of memory being monitored corresponding to the entry, a store bit (or S bit), and a load bit (or L bit), which enable detection of memory stores and loads, respectively, to the range of memory defined by the start address and length.

At a hardware level, a processor checks every access to memory within a running thread. If the address of the memory access matches one of the entries in the CAM, i.e. the address is within a range of memory corresponding to an entry in the CAM, then the hardware issues an exception. The exception causes the state of the thread on the stack to be stored and execution to jump to an exception handling routine in software. A match of the address of the access to an entry in the CAM occurs if the memory access is a store and the corresponding address lies in the range determined by one of the CAM entries with a corresponding S bit being set to a predetermined value, e.g., 1. A match also occurs if the memory access is a load and the corresponding address lies in the range determined by one of the CAM entries with a corresponding L bit being set to a predetermined value, e.g., 1. If the S bit or the L bit is not set to the predetermined value, e.g., the S bit or L bit is set to 0, and the access is a store or load, respectively, then the match is ignored.

To debug an application, the application or the debugger controlling the application, may set the range of memory to be monitored into one of the CAM entries and an exception handler may be provided to handle the exceptions generated upon any memory access to a monitored range. The exception handler may be used to determine where, in the application's code, a particular variable is being modified during execution, for example, by recording the variable's state at the time of the exception as well as other execution parameters, such as may be generated by performance counters, or the like.

The CAM structure allows the hardware to monitor more than one range of memory simultaneously without any performance overhead that may cause execution dilation. To debug a multi-threaded application, the application or a debugger may set the exception handler to check if a received instruction performs a store or a load to a variable's memory address while a protecting synchronization object, e.g., a lock, has been acquired by another thread prior to the access. If not, then this is an instance of a race condition or a demonic access to a shared variable, which are common and difficult to find bugs in multi-threaded applications. If the protecting synchronization object has been acquired prior to the access, then a race condition or demonic access to a shared variable has not been encountered. Other types of hard to find bugs may be found using the hardware mechanisms of the illustrative embodiments to provide support for generating debugging exceptions and branching execution to an appropriate exception handler to gather trace information for debugging purposes.

The mechanisms of the illustrative embodiments may be used in many different types of data processing system and processor architectures. The illustrative embodiments may be used in both single processor sequential processing architectures and multiple processor, multi-threaded data processing system architectures, to provide hardware support for debugging of computer programs. However, for purposes of this description, it will be assumed that the data processing system in which the mechanisms of the illustrative embodiments are implemented is a multi-processor (or multi-core) data processing system that provides multi-threading hardware. It should be appreciated, however, that the illustrative embodiments and the present invention are not limited to such.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 1, an exemplary block diagram of a dual threaded processor design showing functional units and registers is depicted in accordance with an illustrative embodiment. Processor 100 may be implemented as one or more of the processing units in a multi-threaded data processing system architecture, for example. That is, processor 100 may comprise one or more processor cores supporting the simultaneous execution of more than one thread. For example, processor 100 may comprise a single integrated circuit superscalar microprocessor with dual-thread simultaneous multi-threading (SMT) that may also be operated in a single threaded mode. Accordingly, as discussed further herein below, processor 100 includes various units, registers, buffers, memories, and other sections, all of which are formed by integrated circuitry. It should be appreciated that while reference is made herein to a particular processor architecture and particular multi-threading capabilities for illustration purposes, the mechanisms of the illustrative embodiments are applicable to any processor architecture that supports any level of multi-threading, e.g., dual-thread, quad-thread, or the like.

As shown in FIG. 1, instruction fetch unit (IFU) 102 connects to instruction cache 104. Instruction cache 104 holds instructions for multiple programs (threads) to be executed. Instruction cache 104 also has an interface to level 2 (L2) cache/memory 106. IFU 102 requests instructions from instruction cache 104 according to an instruction address, and passes instructions to instruction decode unit 108. In an illustrative embodiment, IFU 102 may request multiple instructions from instruction cache 104 for up to two threads at the same time. Instruction decode unit 108 decodes multiple instructions for up to two threads at the same time and passes decoded instructions to instruction sequencer unit (ISU) 109.

Processor 100 may also include issue queue 110, which receives decoded instructions from ISU 109. Instructions are stored in the issue queue 110 while awaiting dispatch to the appropriate execution units. For an out-of order processor to operate in an in-order manner, ISU 109 may selectively issue instructions quickly using false dependencies between each instruction. If the instruction does not produce data, such as in a read after write dependency, ISU 109 may add an additional source operand (also referred to as a consumer) per instruction to point to the previous target instruction (also referred to as a producer). Issue queue 110, when issuing the producer, may then wakeup the consumer for issue. By introducing false dependencies, a chain of dependent instructions may then be created, whereas the instructions may then be issued only in-order. ISU 109 uses the added consumer for instruction scheduling purposes and the instructions, when executed, do not actually use the data from the added dependency. Once ISU 109 selectively adds any required false dependencies, then issue queue 110 takes over and issues the instructions in order for each thread, and outputs or issues instructions for each thread to execution units 112, 114, 116, 118, 120, 122, 124, 126, and 128 of the processor.

In an illustrative embodiment, the execution units of the processor may include branch unit 112, load/store units (LSUA) 114 and (LSUB) 116, fixed point execution units (FXUA) 118 and (FXUB) 120, floating point execution units (FPUA) 122 and (FPUB) 124, and vector multimedia extension units (VMXA) 126 and (VMXB) 128. Execution units 112, 114, 116, 118, 120, 122, 124, 126, and 128 are fully shared across both threads, meaning that execution units 112, 114, 116, 118, 120, 122, 124, 126, and 128 may receive instructions from either or both threads. The processor includes multiple register sets 130, 132, 134, 136, 138, 140, 142, 144, and 146, which may also be referred to as architected register files (ARFs).

An ARF is a file where completed data is stored once an instruction has completed execution. ARFs 130, 132, 134, 136, 138, 140, 142, 144, and 146 may store data separately for each of the two threads and by the type of instruction, namely general purpose registers (GPRs) 130 and 132, floating point registers (FPRs) 134 and 136, special purpose registers (SPRs) 138 and 140, and vector registers (VRs) 144 and 146. Separately storing completed data by type and by thread assists in reducing processor contention while processing instructions.

The processor additionally includes a set of shared special purpose registers (SPR) 142 for holding program states, such as an instruction pointer, stack pointer, or processor status word, which may be used on instructions from either or both threads. Execution units 112, 114, 116, 118, 120, 122, 124, 126, and 128 are connected to ARFs 130, 132, 134, 136, 138, 140, 142, 144, and 146 through simplified internal bus structure 149.

In order to execute a floating point instruction, FPUA 122 and FPUB 124 retrieves register source operand information, which is input data required to execute an instruction, from FPRs 134 and 136, if the instruction data required to execute the instruction is complete or if the data has passed the point of flushing in the pipeline. Complete data is data that has been generated by an execution unit once an instruction has completed execution and is stored in an ARF, such as ARFs 130, 132, 134, 136, 138, 140, 142, 144, and 146. Incomplete data is data that has been generated during instruction execution where the instruction has not completed execution. FPUA 122 and FPUB 124 input their data according to which thread each executing instruction belongs. For example, FPUA 122 inputs completed data to FPR 134 and FPUB 124 inputs completed data to FPR 136, because FPUA 122, FPUB 124, and FPRs 134 and 136 are thread specific.

During execution of an instruction, FPUA 122 and FPUB 124 output their destination register operand data, or instruction data generated during execution of the instruction, to FPRs 134 and 136 when the instruction has passed the point of flushing in the pipeline. During execution of an instruction, FXUA 118, FXUB 120, LSUA 114, and LSUB 116 output their destination register operand data, or instruction data generated during execution of the instruction, to GPRs 130 and 132 when the instruction has passed the point of flushing in the pipeline. During execution of a subset of instructions, FXUA 118, FXUB 120, and branch unit 112 output their destination register operand data to SPRs 138, 140, and 142 when the instruction has passed the point of flushing in the pipeline. Program states, such as an instruction pointer, stack pointer, or processor status word, stored in SPRs 138 and 140 indicate thread priority 152 to ISU 109. During execution of an instruction, VMXA 126 and VMXB 128 output their destination register operand data to VRs 144 and 146 when the instruction has passed the point of flushing in the pipeline.

Data cache 150 may also have associated with it a non-cacheable unit (not shown) which accepts data from the processor and writes it directly to level 2 cache/memory 106. In this way, the non-cacheable unit bypasses the coherency protocols required for storage to cache.

In response to the instructions input from instruction cache 104 and decoded by instruction decode unit 108, ISU 109 selectively dispatches the instructions to issue queue 110 and then onto execution units 112, 114, 116, 118, 120, 122, 124, 126, and 128 with regard to instruction type and thread. In turn, execution units 112, 114, 116, 118, 120, 122, 124, 126, and 128 execute one or more instructions of a particular class or type of instructions. For example, FXUA 118 and FXUB 120 execute fixed point mathematical operations on register source operands, such as addition, subtraction, ANDing, ORing and XORing. FPUA 122 and FPUB 124 execute floating point mathematical operations on register source operands, such as floating point multiplication and division. LSUA 114 and LSUB 116 execute load and store instructions, which move operand data between data cache 150 and ARFs 130, 132, 134, and 136. VMXA 126 and VMXB 128 execute single instruction operations that include multiple data. Branch unit 112 executes branch instructions which conditionally alter the flow of execution through a program by modifying the instruction address used by IFU 102 to request instructions from instruction cache 104.

Instruction completion unit 154 monitors internal bus structure 149 to determine when instructions executing in execution units 112, 114, 116, 118, 120, 122, 124, 126, and 128 are finished writing their operand results to ARFs 130, 132, 134, 136, 138, 140, 142, 144, and 146. Instructions executed by branch unit 112, FXUA 118, FXUB 120, LSUA 114, and LSUB 116 require the same number of cycles to execute, while instructions executed by FPUA 122, FPUB 124, VMXA 126, and VMXB 128 require a variable, and a larger number of cycles to execute. Therefore, instructions that are grouped together and start executing at the same time do not necessarily finish executing at the same time. "Completion" of an instruction means that the instruction is finishing executing in one of execution units 112, 114, 116, 118, 120, 122, 124, 126, or 128, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 154 monitors for the completion of instructions, and sends control information 156 to ISU 109 to notify ISU 109 that more groups of instructions can be dispatched to execution units 112, 114, 116, 118, 120, 122, 124, 126, and 128. ISU 109 sends dispatch signal 158, which serves as a throttle to bring more instructions down the pipeline to the dispatch unit, to IFU 102 and instruction decode unit 108 to indicate that it is ready to receive more decoded instructions. While processor 100 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

In the architecture shown in FIG. 1, one or more of the load/store units 114 and 116 may be augmented to include a hardware content addressable memory (CAM) structure and logic for implementing the mechanisms of the illustrative embodiments. A content addressable memory (CAM) is a special type of hardware search engine that is much faster than algorithmic approaches for search intensive applications. CAMs are composed of conventional semiconductor memory, usually SRAM, with added comparison circuitry that enables a search operation to complete in a single processor clock cycle. For more information regarding CAMs, reference is made to Pagiamtzis et al., "Content-Addressable Memory (CAM) Circuits and Architectures: A Tutorial and Survey," IEEE Journal of Solid-State Circuits, Vol. 41, No. 3, pp. 712-727, March 2006.

The logic of the load/store unit and its CAM structure are configurable by an application, debugger, or the like, to define ranges of memory, such as main memory, for which load and/or store operations targeting that range of memory should generate an exception in order to facilitate gathering of debugging information. The processor is augmented with special instructions to allow the debugger or the application to access the CAM structure, such as to load the CAM structure with ranges, and to set the corresponding S and L bits. Also, the instructions allow the application to turn off the CAM altogether to save energy when no debugging is taking place.

The application or debugger creates an entry in the CAM structure that specifies the starting address of the range of memory, a length of the range of memory, and whether loads, stores, or loads and stores to this range of memory are to generate an exception for handling by an exception handler or the debugger application. This information is stored in the entry in the CAM structure and is searchable based on an address of an access operation to determine if the address of the access operation falls within a range specified by one of the entries in the CAM structure. If so, and the access operation is one that is indicated as being an access operation that generates an exception, the exception may be generated and handled by either an exception handler or the debugger to gather debugging information and/or perform the actual debugging of the application. This may be done whether or not the application is a multi-threaded application or not.

The exception handler or debugger may be configured to identify difficult to find bugs in multi-threaded applications, such as race conditions or demonic accesses to shared variables. For example, in order to check for race conditions or demonic accesses, the exception handler or debugger may check to see if the thread that submitted the access operation had acquired a lock on the memory location specified by the address in the access operation prior to attempting the access operation. If so, then the debugger or exception handler may not perform any actions and instead allow the application to resume execution. However, if the thread that attempted the access operation did not first obtain the lock for the memory location, then the debugger or exception handler may take over the execution of the application and retrieve debug or trace information for use in analysis to identify a potential bug in the application code.

If the access operation is one that is not indicated as being an access operation that generates an exception, or the address of the access operation does not fall within one of the ranges of memory defined by an entry in the CAM, then the access operation may be performed without generating an exception.

Figure 2:
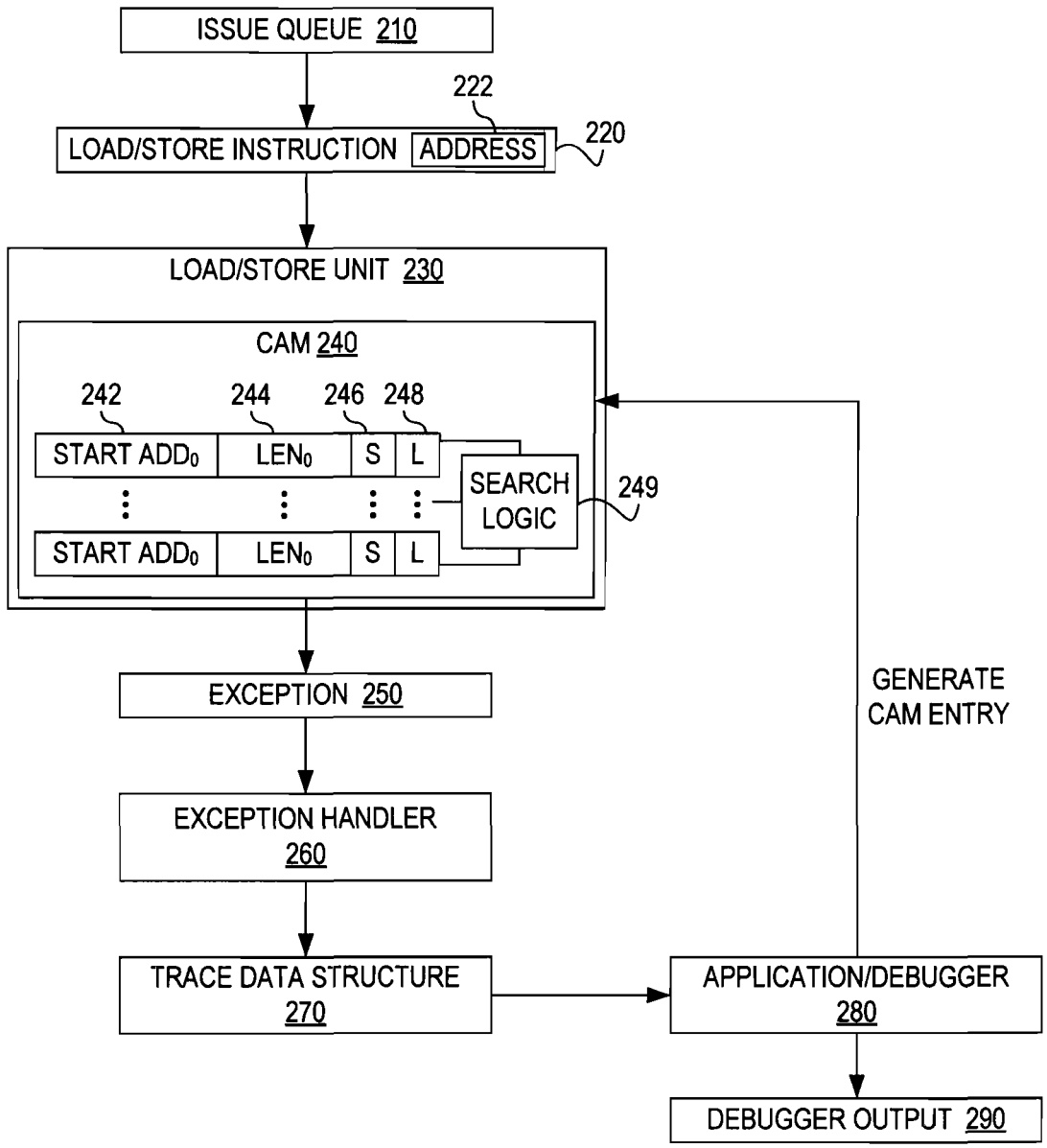
FIG. 2 is an example block diagram of a load/store unit in accordance with one illustrative embodiment.

FIG. 2 is an example block diagram of a load/store unit in accordance with one illustrative embodiment. As shown in FIG. 2, the load/store unit 230 is augmented to include a content addressable memory (CAM) having one or more CAM entries and search logic 249. Each CAM entry includes a start address 242, a length 244, a store bit (S bit) 246, and a load bit (L bit) 248. The start address 242 and length 244 define an address range of memory that is to be monitored using the CAM 240. The start address 242 and length 244 may be specified in terms of effective addresses, virtual addresses, real or physical addresses, or the like, depending upon the particular implementation. The S bit 246 and L bit 248 designate whether one or both of store and load instructions/operations targeting the address range of memory specified by the corresponding start address 242 and length 244 are to be monitored, i.e. should generate an exception requiring exception handling.

It should be noted that, in some implementations of the illustrative embodiments, a single CAM structure 240 may be used to handle all load/store instructions executed by all threads executing in the processor architecture. Alternatively, separate CAM structures 240 may be provided for each of the threads such that the CAM structures 240 are associated with a thread context. Thus, the load/store unit 230 may have multiple CAM structures 240, one for each thread executing in the processor. Alternatively, in an architecture having multiple load/store units 230, each load/store unit 230 may have one or more CAM structures 240 for each of the threads that they handle. In the case of multiple CAM structures 240, one for each thread, which CAM structure 240 corresponds to which thread may be specified in the thread context information of the particular thread.

An application or debugger 280 may generate entries in the CAM 240 so that certain address ranges of memory are monitored and certain instructions, e.g., store and/or load instructions, targeting the monitored address range of memory are monitored. It should be appreciated that with the mechanisms of the illustrative embodiments, not all portions of the monitored memory need to be monitored. To the contrary, the mechanisms of the illustrative embodiments allow the application or debugger 280 to target individual portions of memory, i.e. individual address ranges of memory, so that targeted tracing and debugging can be performed. For example, an entry in the CAM may be associated with an address range of memory corresponding to a particular variable and thus, the mechanisms of the illustrative embodiments may be used to trace and debug the execution of the application code with regard to this particular variable.

The search logic 249 of the CAM 240 is used to quickly search all of the entries in the CAM 240 in the same processor cycle and determine if there is a matching entry to an input address. In particular, in response to an issue queue 210 issuing an instruction 220 to the load/store unit 230, the search logic 249 receives an input address 222 associated with the instruction 220. The instruction 220 may be either a load or a store instruction. In response to receiving the instruction 220 and its input address 222, the search logic 249 searches the address ranges specified by the start address 242 and length 244 of each of the entries in the CAM 240 to determine if the input address 222 falls within an address range of an entry in the CAM 240. If so, the state of the S bit 246 and L bit 248 of the matching entry is determined and compared to an opcode of the load or store instruction 220. If the opcode of the instruction 220 indicates that the instruction is a store instruction, and the S bit 246 of the corresponding matching CAM entry is set to a predetermined value, e.g., 1, then the logic of the CAM 240 may generate an exception 250. Similarly, if the opcode of the instruction 220 indicates that the instruction is a load instruction, and the L bit 248 of the corresponding matching CAM entry is set to a predetermined value, e.g., 1, then the logic of the CAM 240 may also generate an exception 250. If the instruction is a load instruction or a store instruction and the corresponding S bit 246 or L bit 248 is not set to the predetermined value, then no exception is generated and the execution of the instruction simply continues in a normal manner through the load/store unit 230.

It should be noted that this check against the entries in the CAM 240 is performed for each thread that submits the load/store instruction 220. Thus, multiple threads may be executing in the processor and each thread is checked by its corresponding CAM structure in the manner described above to determine whether the load/store instruction 220 targets an address range of interest and is an instruction of interest. Hence, it is possible to monitor multiple threads at substantially the same time without having to serialize the monitoring on a thread by thread basis as is required in the prior art. Moreover, the CAM structure 240 allows individual address ranges of the memory to be targeted as well as individual types of instructions, e.g., either loads, stores, or both loads and stores.

In the event that an exception 250 is generated by the CAM 240, the exception may be provided to an exception handler 260. Alternatively, the exception may be sent directly to the application or debugger 380 rather than having a separate exception handler 260. The exception handler 260 or the application/debugger 280 may have been previously registered receive exceptions on behalf of the executing application. This can be done using traditional operating system techniques such as UNIX's ptrace( ) system call or the signal handling mechanisms of UNIX and UNIX-like systems. The operating system is responsible for channeling the exception to the appropriate entity (debugger or application) and at the appropriate code handler, as done in the current art. Execution of the application code is branched to the exception handler 260 or application/debugger 280 in the event of the exception 250 being generated which then may operate to collect trace/debug information in a trace data structure 270. The application/debugger 280 may operate on the trace data structure 270 to perform analysis and identify potential bugs in the application code.

For example, the application/debugger 280 may identify potential race conditions or demonic accesses by multiple threads accessing the same address range of memory at substantially a same time. Race conditions or demonic accesses may pose serious problems with the execution of application code since data may be corrupted or otherwise made incorrect for one or more of the threads attempting to access that data due to one thread modifying the data while the other thread is attempting to use the data or modify it in a different manner. For example, a first thread may be of the type:
Lock(I);
v+=1;
Unlock (I);
and a second thread may be of the type:
v+=2; //demonic variable access
If v==3 before entering the first thread, then v==4, v==5, v==6 are all possible after exit. The same is true if v==2 before entry into the second thread. Moreover, if v==3 before entry into the second thread, both v==5 and v==6 are also possible. Thus, there is the possibility, with concurrent execution of the first and second thread, that a race condition or demonic access occurs when v is the same value in both the first and second threads. Such race conditions or demonic accesses may be detected with regard to thread 2 in that thread 2 does not obtain the lock on the memory location before attempting to access it. This is a simple example, but it illustrates the possible problem. Actual errors occurring in multi-threaded applications will typically be more complex than this but may likewise be detected using the CAM structure and exception handling of the illustrative embodiments.

The application/debugger 280 may provide a debugger output 290 detailing the results of the analysis performed by the application/debugger 280 on the trace information stored in the trace data structure 270. For example, the application/debugger 280 may identify possible race conditions or demonic accesses by threads, identify the threads involved and the instructions that gave rise to the race conditions/demonic accesses, or the like. Various types of debugger outputs 290 may be provided based on the trace information gathered in the trace data structure 270 and the analysis performed by the application/debugger 280.

Figure 3:
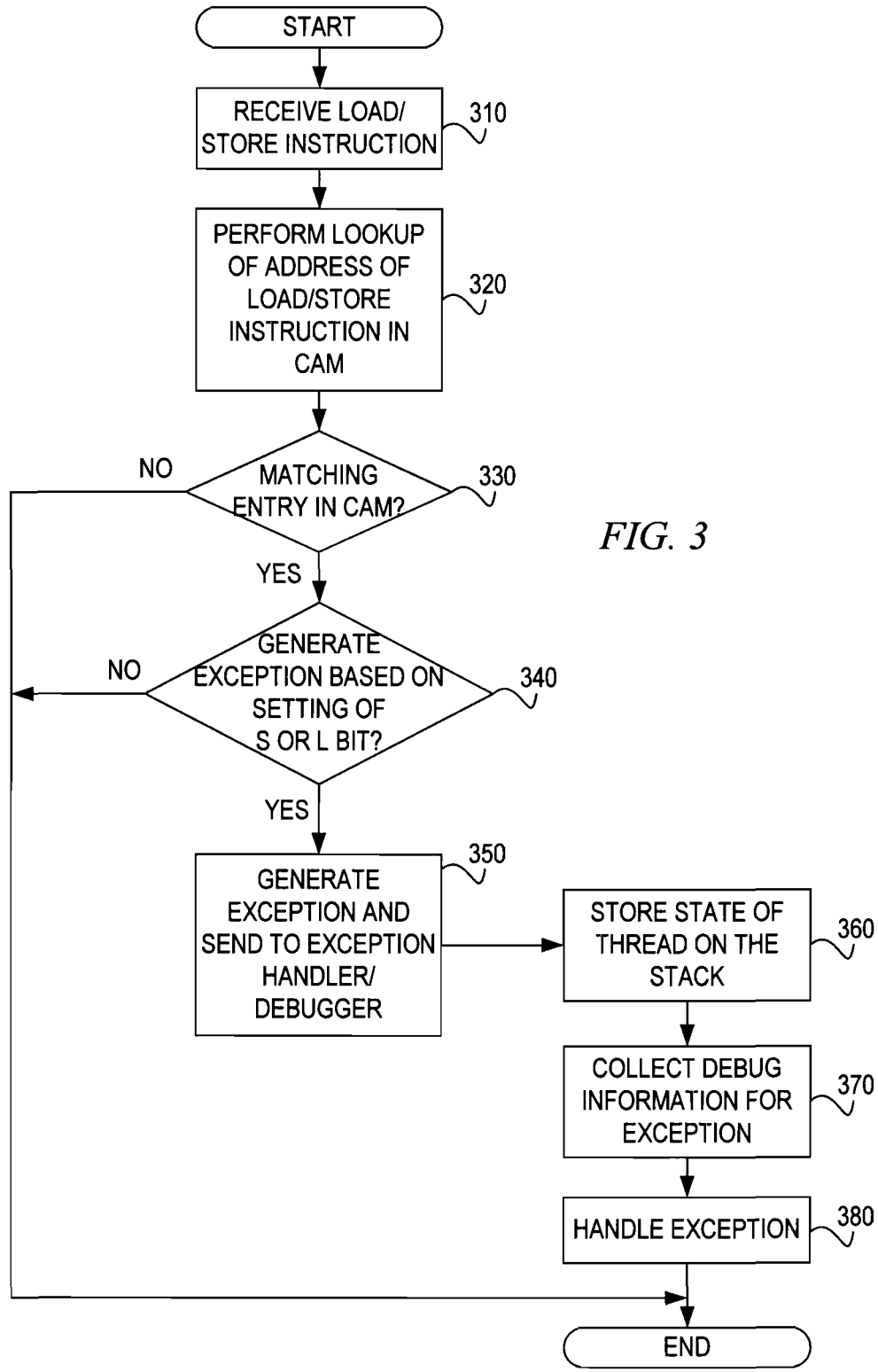
FIG. 3 is a flowchart outlining an example operation of a load/store unit in accordance with one illustrative embodiment.

FIG. 3 is a flowchart outlining an example operation of a load/store unit in accordance with one illustrative embodiment with regard to using a content addressable memory (CAM) to trigger exceptions when load and/or store instructions, regardless of thread, attempt to access an address range of memory of interest. The operation in FIG. 3 assumes that the CAM structure is present in the load/store unit and has been populated with one or more entries specifying address ranges of memory that are of interest to a debugger. As noted above, a debugger may write entries to the CAM structure to identify the address ranges of memory that are interest to the debugger and may set the appropriate S bit and/or L bit for the types of instructions that are of interest to the debugger. The debugger may be registered with the system for handling exceptions generated by the CAM structure as discussed above.

As shown in FIG. 3, the operation starts with the receipt, in the load/store unit, of a load or store instruction (step 310). A lookup operation, or search, is performed in the CAM for the address specified in the load or store instruction to determine if the specified address is within an address range defined by one of the entries in the CAM (step 320). A determination is made as to whether there is a matching entry (step 330). If so, then a determination is made as to whether to generate an exception or not based on the setting of the S bit and L bit of the matching entry (step 340). For example, as mentioned above, if the instruction is a store and the S bit is set, of if the instruction is a load and the L bit is set, then an exception may be generated. Otherwise, the exception is not generated.

If an exception is to be generated, the exception is generated and sent to an exception handler or debugger (step 350). The state of the thread that issued the load or store instruction is stored on the stack (step 360) and debug or trace information is gathered for the thread that generated the exception (step 370). The exception is then handled by either the exception handler or the debugger (step 380).

For example, the exception handler may analyze the debug/trace information gathered and determine if a race condition or demonic access is detected to have occurred. One way in which such conditions may be detected is to determine if the thread that issued the load or store instruction obtained a lock on the address range of the corresponding entry in the CAM, or at least the specific memory location identified by the address in the load or store instruction, before attempting to perform the load or store on the memory location. If so, then there is no race condition or demonic access. If the lock was not obtained, then a race condition or demonic access may have occurred.

Thus, the illustrative embodiments provide hardware mechanisms for providing a CAM structure to assist in debugging application code. The mechanisms of the illustrative embodiments are especially well suited for assisting in the debugging of multi-threaded application code since one or more CAM structures, which may be associated with particular thread contexts, may be provided for generating exceptions whenever a processor attempts to access an address range of memory, regardless of the particular thread attempting the access. In this way, multiple concurrently running threads may be monitored concurrently with regard to specific address ranges of interest and with regard to particular types of instructions of interest.

It should be appreciated that while the illustrative embodiments are described in terms of a CAM structure being provided in a load/store unit of a processor to monitor loads and/or stores to certain address ranges of memory, the illustrative embodiments are not limited to such. Rather, similar CAM structures may be provided in other functional units of a processor in order to monitor different types of instructions being executed in the processor. For example, similar CAM structures may be provided in the branch unit 112 in FIG. 1, the floating point units 122 or 124, or the like, in order to monitor for different types of instructions and generating corresponding exceptions for generating debug or trace information. The key concept being the use of a hardware CAM structure to designate the address ranges of memory that are of interest and the types of instructions of interest and generating an exception when an instruction of interest targets an address range of interest, regardless of which thread is executing the instruction.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a processor of processing system, for debugging application code, comprising:

receiving an instruction in a hardware unit of the processor, the instruction having a target memory address that the instruction is attempting to access in a memory of the data processing system;

searching a content addressable memory (CAM) associated with the hardware unit for an entry in the CAM corresponding to the target memory address, wherein each entry of a set of entries in the CAM comprise a start address a length, a store bit (S bit), and a load bit (L bit), wherein the S bit and the L bit identify types of instructions for which an exception is to be generated wherein a setting of either the S bit or the L bit to a predetermined value indicates that a corresponding type of instruction is an instruction for which the exception is to be generated, and wherein the processor searches the CAM by searching entries in the CAM for an en that falls within one of a plurality of entries indicated by a starting address and length corresponding to a range of memory addresses within which the target memory address is present;

responsive to the entry in the CAM corresponding to the target memory address being found, determining whether information in the entry identifies the received instruction as the instruction for which the exception is to be generated by:

determining a type of the received instruction:, determining whether the value in the entry indicates that the type of the received instruction is a type of instruction for which the exception should be generated; and responsive to the value in the entry indicating that the type of the received instruction is the type of instruction for which the exception should be generated, identifying that the received instruction is the instruction for which the exception is to be generated;

responsive to the entry identifying the received instruction as the instruction for which the exception is to be generated, generating an exception and sending the exception to one of an exception handler or a debugger application;

responsive to the exception handler or the debugger application detecting access to a particular variable with which the target memory address is associated, verifying that the instruction has procured a necessary synchronization construct prior accessing the particular variable thereby indicating that a race condition to the particular variable has not been encountered; and responsive to the exception handler or the debugger application detecting a failure to access the particular variable with which the target memory address is associated, verifying that the instruction has not procured the necessary synchronization construct prior to accessing the particular variable thereby indicating that the race condition to the particular variable has been encountered.

2. The method of claim 1, wherein the type of received instruction is one of a load instruction or a store instruction, and wherein the value in the entry indicates whether a load instruction or a store instruction is the instruction for which the exception is to be generated.

3. The method of claim 1, wherein the set of entries in the CAM are created by the debugger application to identify a range of addresses in the memory to be monitored for debugging purposes.

4. The method of claim 1, wherein the exception handler determines where, in application code, the particular variable is being modified during execution of the application code by recording a state of the particular variable at the time of the exception.

5. The method of claim 1, wherein the exception handler checks for a race condition by checking whether the received instruction operates on a target address of the particular variable while a protecting synchronization object has been acquired by another thread prior to the received instruction attempting to access the target address of the particular variable, and wherein a race condition is not present when the received instruction does not operate on a target address of the particular variable for which a protecting synchronization object has been acquired by another thread prior to the received instruction attempting to access the target address of the particular variable.

6. The method of claim 1, wherein the processor maintains a plurality of CAMs, one for each thread of execution supported by the processor.

7. The method of claim 1, wherein the exception handler checks whether the received instruction operates on a target address of a variable without procuring a corresponding synchronization object.

8. The method of claim I, wherein determining whether the value in the entry indicates that the type of the received instruction is the type of instruction for which the exception should be generated further comprises:
responsive to the received instruction being a store instruction and a corresponding S bit associated with the entry in the CAM being set to the predetermined value, determining that the received instruction is the instruction for which the exception is to be generated.

9. The method of claim 1, wherein determining whether the value in the entry indicates that the type of the received instruction is the type of instruction for which the exception should be generated further comprises:
responsive to the received instruction being a load instruction and a corresponding L bit associated with the entry in the CAM being set to the predetermined value, determining that the received instruction is the instruction for which the exception is to be generated.

10. A data processing system, comprising:
a processor, comprising a hardware unit having a content addressable memory (CAM); and
a memory coupled to the processor, wherein the processor is configured to:
receive an instruction in the hardware unit of the processor, the instruction having a target memory address that the instruction is attempting to access in the memory of the data processing system;
search the CAM for an entry in the CAM corresponding to the target memory address, wherein each entry of a set of entries in the CAM comprise a start address, a length, a store bit (S bit), and a load bit (L hit), wherein the S bit and the L hit identify types of instructions for which an exception is to be generated, wherein a setting of either the S bit or the L bit to a predetermined value indicates that a corresponding type of instruction is an instruction for which the exception is to be generated, and wherein the processor searches the CAM by searching entries in the CAM for an entry that falls within one of a plurality of entries indicated by a starting address and length corresponding to a range of memory addresses within which the target memory address is present;
responsive to the entry in the CAM corresponding to the target memory address being found, determine whether information in the entry identifies the received instruction as the instruction for which the exception is to be generated by:
determining a type of the received instruction;
determining whether the value in the entry indicates that the type of the received instruction is a type of instruction for which the exception should be generated; and
responsive to the value in the entry indicating that the type of the received instruction is the type of instruction for which the exception should be generated, identifying that the received instruction is the instruction for which the exception is to be generated;
responsive to the entry identifying the received instruction as the instruction for which the exception is to be generated, generate an exception and send the exception to one of an exception handler or a debugger application;
responsive to the exception handler or the debugger application detecting access to a particular variable with which the target memory address is associated, verifying that the instruction has procured a necessary synchronization construct prior to accessing the particular variable thereby indicating that a race condition to the particular variable has not been encountered; and
responsive to the exception handler or the debugger application detecting a failure to access the particular variable with which the target memory address is associated, verifying that the instruction has not procured the necessary synchronization construct prior to accessing the particular variable thereby indicating that the race condition to the particular variable has been encountered.

11. The system of claim 10, wherein the type of received instruction is one of a load instruction or a store instruction, and wherein the value in the entry indicates whether a load instruction or a store instruction is the instruction for which the exception is to be generated.

12. The system of claim 10, wherein:
the set of entries in the CAM are created by the debugger application to identify a range of addresses in the memory to be monitored for debugging purposes,
the exception handler determines where, in application code, the particular variable is being modified during execution of the application code by recording a state of the particular variable at the time of the exception,
the exception handler checks for a race condition by checking whether the received instruction operates on a target address of the particular variable while a protecting synchronization object has been acquired by another thread prior to the received instruction attempting to access the target address of the particular variable, and
a race condition is not present when the received instruction does not operate on a target address of the particular variable for which a protecting synchronization object has been acquired by another thread prior to the received instruction attempting to access the target address of the particular variable.

13. The system of claim 10, wherein the processor maintains a plurality of CAMs, one for each thread of execution supported by the processor.

14. The system of claim 10, wherein determining whether the value in the entry indicates that the type of the received instruction is the type of instruction for which the exception should be generated further comprises:

responsive to the received instruction being a store instruction ad as corresponding S bit associated with the entry in the CAM being set to the predetermined value, determining that the received instruction is the instruction for which the exception is to be generated.

15. The system of claim 10, wherein determining whether the value in the entry indicates that the type of the received instruction is the type of instruction for which the exception should be generated further comprises:
responsive to the received instruction being a load instruction and a corresponding L bit associated with the entry in the CAM being set to the predetermined value, determining that the received instruction is the instruction for which the exception is to be generated.

16. A computer program product comprising a computer recordable medium having a computer readable program recorded thereon, wherein the computer readable program, when executed on a computing device, causes the computing device to:
receive an instruction in a hardware unit of a processor of the computing device, the instruction having a target memory address that the instruction is attempting to access in a memory of the computing device;
search a content addressable memory (CAM) associated with the hardware unit for an entry in the CAM corresponding to the target memory address, wherein each entry of a set of entries in the CAM comprise a start address, a length, a store bit (S bit), and a load bit (L bit), wherein the S bit and the L bit identify types of instructions for which an exception is to be generated, wherein a setting of either the S bit or the L bit to a predetermined value indicates that a corresponding type of instruction is an instruction for which the exception is to be generated, and wherein the processor searches the CAM by searching entries in the CAM for an entry that falls within one of a plurality of entries indicated by a starting address and length corresponding to a range of memory addresses within which the target memory address is present;
responsive to the entry in the CAM corresponding to the target memory address being found, determine whether information in the entry identifies the received instruction as the instruction for which the exception is to be generated by:
determining a type of the received instruction;
determining whether the value in the entry indicates that the type of the received instruction is a type of instruction for which the exception should be generated; and
responsive to the value in the entry indicating that the type of the received instruction is the type of instruction for which the exception should be generated, identifying that the received instruction is the instruction for which the exception is to be generated;
responsive to the entry identifying the received instruction as the instruction for which the exception is to be generated, generate an exception and send the exception to one of an exception handler or a debugger application;
responsive to the exception handler or the debugger application detecting access to a particular variable with which the target memory address is associated, verifying that the instruction has procured a necessary synchronization construct prior to accessing the particular variable thereby indicating that a race condition to the particular variable has not been encountered; and
responsive to the exception handler or the debugger application detecting a failure to access the particular variable with which the target memory address is associated, verifying that the instruction has not procured the necessary synchronization construct prior to accessing the particular variable thereby indicating that the race condition to the particular variable has been encountered.

17. The computer program product of claim 16, wherein the type of received instruction is one of a load instruction or a store instruction, and wherein the value in the entry indicates whether a load instruction or a store instruction is the instruction for which the exception is to be generated.

18. The computer program product of claim 16, wherein:
the set of entries in the CAM are created by the debugger application to identify a range of addresses in the memory to be monitored for debugging purposes,
the exception handler determines where, in application code, the particular variable is being modified during execution of the application code by recording a state of the particular variable at the time of the exception,
the exception handler checks for a race condition by checking whether the received instruction operates on a target address of the particular variable while a protecting synchronization object has been acquired by another thread prior to the received instruction attempting to access the target address of the particular variable, and
a race condition is not present when the received instruction does not operate on a target address of the particular variable for which a protecting synchronization object has been acquired by another thread prior to the received instruction attempting to access the target address of the particular variable.

19. The computer program product of claim 16, wherein determining whether the value in the entry indicates that the type of the received instruction is the type of instruction for which the exception should be generated further comprises:
responsive to the received instruction being a store instruction and a corresponding S bit associated with the entry in the CAM being set to the predetermined value, determining that the received instruction is the instruction for which the exception is to be generated.

20. The computer program product of claim 16, wherein determining whether the value in the entry indicates that the type of the received instruction is the type of instruction for which the exception should be generated further comprises:
responsive to the received instruction being a load instruction and a corresponding L bit associated with the entry in the CAM being set to the predetermined value, determining that the received instruction is the instruction for which the exception is to be generated.

* * * * *